United States Patent [19]
Lee et al.

[11] Patent Number: 6,088,112
[45] Date of Patent: Jul. 11, 2000

[54] IMAGE SENSOR HAVING TEST PATTERNS FOR MEASURING CHARACTERISTICS OF COLOR FILTERS

[75] Inventors: Ju Il Lee; Nan Yi Lee, both of Ichon, Rep. of Korea

[73] Assignee: Hyundai Electronics Industries Co., Ltd., Ichon, Rep. of Korea

[21] Appl. No.: 09/344,823

[22] Filed: Jun. 25, 1999

[30] Foreign Application Priority Data

Jun. 27, 1998 [KR] Rep. of Korea .................. 1998-24574

[51] Int. Cl.⁷ .................................. G01B 11/00
[52] U.S. Cl. ........................ 356/394; 356/402; 356/407
[58] Field of Search ................................ 356/402, 396, 356/407, 394

[56] References Cited

U.S. PATENT DOCUMENTS 5,841,159  11/1998  Lee et al. ................................ 257/291

*Primary Examiner*—Frank G. Font
*Assistant Examiner*—Reginald A. Ratliff
*Attorney, Agent, or Firm*—Townsend and Townsend and Crew LLP

[57] ABSTRACT

The present invention relates to an image sensor; and, more particularly, to an image sensor having test patterns for measuring characteristics of color filters. In accordance with the present invention, the separate quartz wafer or glass wafer is not required. Therefore, unnecessary cost can be saved and high price of light measuring instrument is not necessary any longer, because it is possible to measure the characteristic of exact color filter on substantial wafer. Moreover, since the measurement of color filter is available on the silicon wafer where substantial image sensor is manufactured, the results of measurement are much more exact and it is possible to promptly apply the results to successive wafer or lot. Thus, it contributes to the improvement of yield of the image sensors.

15 Claims, 2 Drawing Sheets

IMAGE SENSOR HAVING TEST PATTERNS FOR MEASURING CHARACTERISTICS OF COLOR FILTERS

FIELD OF THE INVENTION

The present invention relates to an image sensor; and, more particularly, to an image sensor having test patterns for measuring characteristics of color filters.

DESCRIPTION OF THE PRIOR ART

As well known, image sensors have color filters, which are arranged on the upper part of light sensing area to produce and accumulate photoelectric charges generated by light from an object. The color filters are composed of three colors of Red, Green and Blue or Yellow, Magenta and Cyan (hereinafter, each color filter of Red, Green and Blue is referred to as R, G and B color filter, respectively, and each color filter of Yellow, Magenta and Cyan is referred to as Ye, Ma and Cy color filter).

After the transmission of light, it is necessary to measure what kinds of characteristics each color filter has. In the prior art, the test is not embodied in the wafer where substantial elements are manufactured but in a special wafer for measuring characteristics of the color filters. Accordingly, a separate wafer for color filter test should be fabricated.

FIGS. 1a and 1b are schematic views illustrating a conventional method for measuring the characteristics of color filters. Referring to FIG. 1a, color filter materials, such as R, G, B, Ye, Ma, Cy and etc., are coated on a transparent quartz wafer 11, which is specially prepared in order to measure the characteristic of color filters used in an image sensor. The characteristic of color filters substantially patterned within a chip is analogized by measuring light transmittance and chromaticity in the transparent quartz wafer 11 using a spectrophotometer 13. FIG. 1b is a layout of the quartz wafer 11 on which color filter material is coated.

The conventional test separately needs a quartz or glass wafer. Furthermore, since additional color filter coating processes are required, there are some difficulties in equipping high price of color filter register as well as light measuring instrument. Moreover, the most important problem is that the result obtained through such a measurement and the characteristic of color filter patterned on substantial wafer differently come out because the characteristic of color filter can be changed according to the color filter coating processes. For example, the characteristic of color filter may be changed at the time of arranging color filters.

SUMMARY OF THE INVENTION

It is, therefore, an object of the present invention to provide an image sensor having test patterns for measuring a characteristic of color filters.

It is another object of the present invention to provide an image sensor capable of saving color filter testing cost by excluding a separate test of quartz wafers.

It is further another object of the present invention to provide an image sensor for measuring characteristics of color filters on the wafer where actual elements are produced.

In accordance with an aspect of the present invention, there is provided an image sensor having color filter array having a plurality of color filters, the image sensor comprising: a testing means including: a) a first light sensing means receiving light from an object in a range of overall wavelength; b) a plurality of second light sensing means, each of which is covered with a corresponding color filter; and c) a current measuring means for measuring current from the first and second light sensing means, whereby electrical characteristics of the image sensor are checked by comparing current between the first light sensing means and the current measuring means with current between the second light sensing means and the current measuring means.

In accordance with another aspect of the present invention, there is provided an image sensor comprising: a plurality of first photodiodes formed on a wafer, for receiving light from an object and producing an image, wherein the first photodiodes are covered with corresponding color filters; and a test means formed on a portion of the wafer, the test means includes: a) at least one second photodiode receiving light from an object in a range of overall wavelength; b) a plurality of third photodiodes, each of which is covered with a corresponding color filter; and c) a current measuring means for measuring current from each of the second and third photodiodes, whereby electrical characteristics of the image sensor are checked by comparing current between the second photodiode and the third photodiodes with current between the third photodiodes and the current measuring means.

BRIEF DESCRIPTION OF THE DRAWINGS

The above and other objects and features of the present invention will become apparent from the following description of the preferred embodiments given in conjunction with the accompanying drawings, in which:

FIG. 2b is a cross-sectional view taken along the line A–A' in FIG. 2a.

DETAILED DESCRIPTION OF THE PREFERRED EMBODIMENTS

Hereinafter, the present invention will be described in detail referring to the accompanying drawings.

Figure 1A:
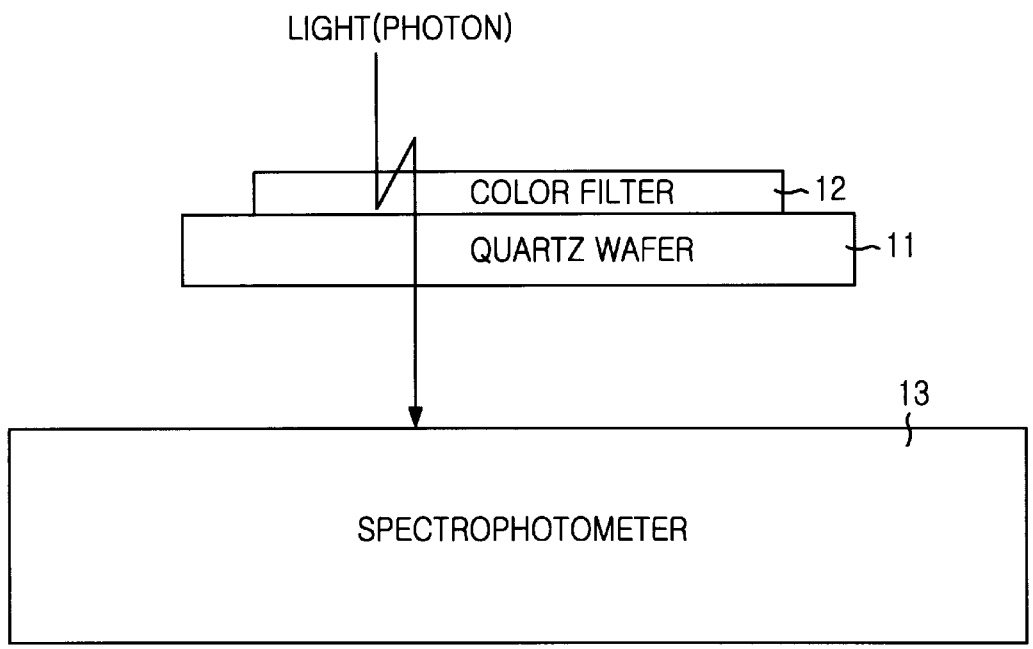
FIGS. 1a and 1b are schematic views illustrating a conventional method for measuring characteristics of color filters.
Figure 1B:
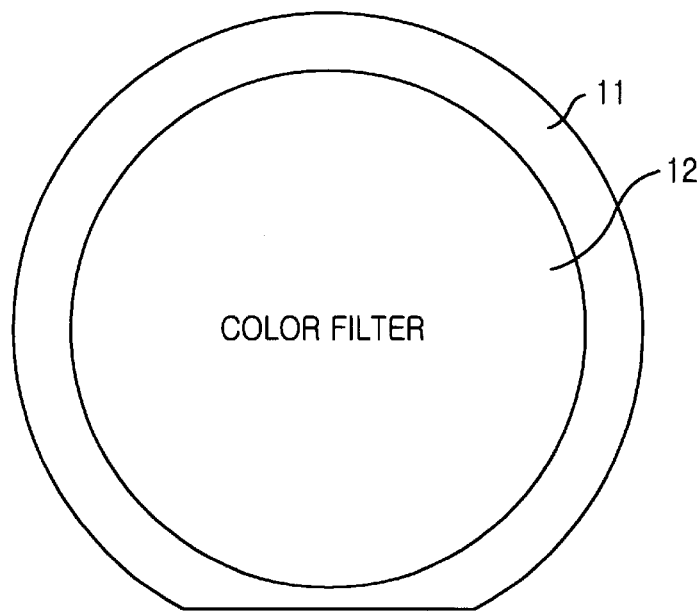
Figure 2A:
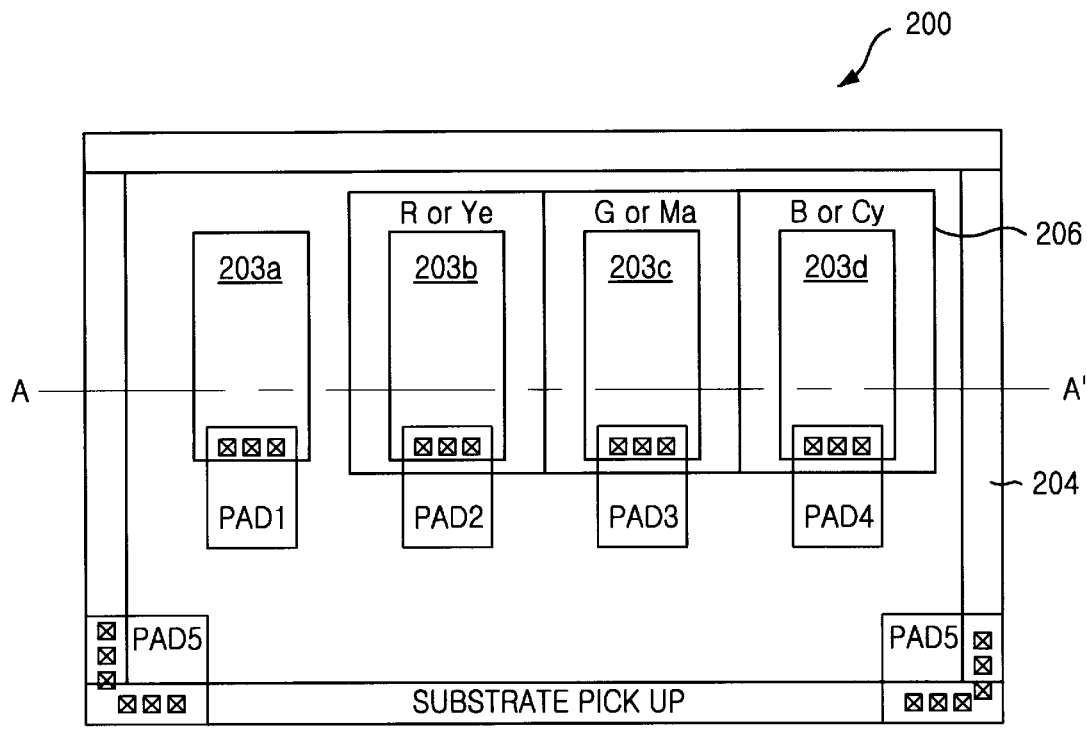
FIG. 2a is a layout of a test pattern according to an embodiment of the present invention.
Figure 2B:
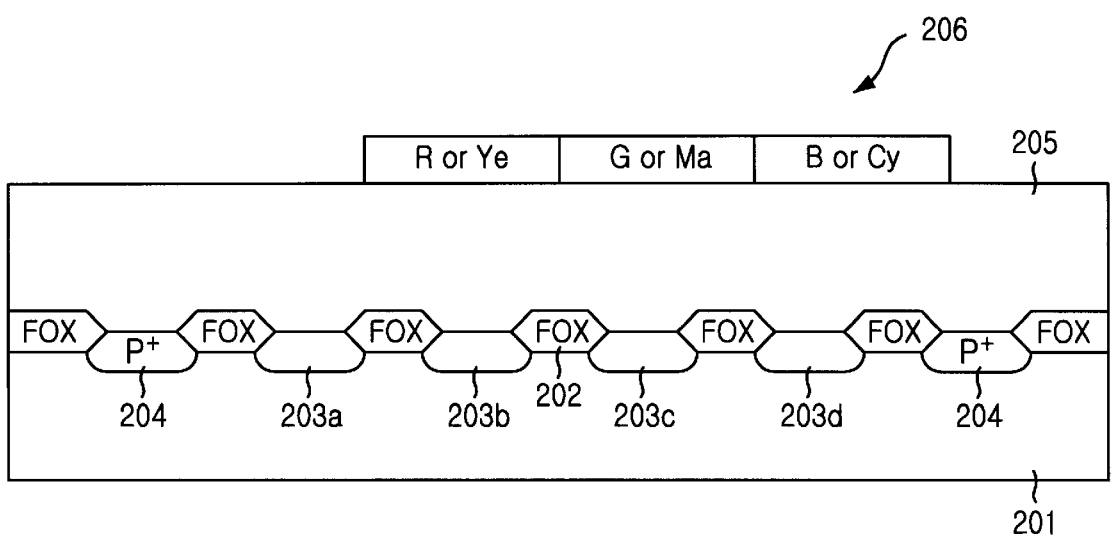

Referring to FIGS. 2a and 2B, a test pattern 200 of the present invention is formed at the empty space of a silicon wafer where image sensor is formed. That is, the test pattern 200 is simultaneously formed at the empty space of the silicon wafer at the time of carrying out a series of image sensor forming processes. This test pattern formation only needs the changes of masks.

The test pattern 200 according to the present invention has four light sensing areas 203a to 203d divided from one another by field oxide layers (FOX) 202 which are formed in a substrate 201. A $P^+$ pick-up diffusion layer 204 of ring type is formed on the wafer for picking up substrate current, surrounding the four light sensing areas 203a to 203d. The $P^+$ pick-up diffusion layer 204 is isolated from the light sensing areas 203a to 203d by the field oxide layers 202.

Each of the light sensing areas 203a to 203d is implemented by a light sensing device, such as a buried photodiode (or pinned photodiode), which is the same as the constitution of the photodiode of the image sensor. The light sensing areas 203a to 203d and the $P^+$ pick-up diffusion layer 204 are covered with a transparent insulating layer 205 (e.g. an oxide layer) into which light can be transmitted and color filters 206 are patterned on the insulating layer 205. Accordingly, there is no color filter on the upper part of the first-light sensing area 203a among the four light sensing areas, R or Ye color filter exists on the upper part of the second light sensing area 203b, G or Ma color filter on the upper part of the third light sensing area 203c, and B or Cy color filter on the upper part of the fourth light sensing area 203d. Further, pads PAD1 to PAD4 for electric measurement are formed on each light sensing areas 203a, 203b, 203c and 203d, respectively, and also a pad PAD5 is formed on the P$^+$ pick-up diffusion layer 204.

When predetermined illumination is applied to the test pattern 200, photoelectric current flowing between each of the first to fourth light sensing areas 203a to 203d, in which photoelectric charges are generated by incident light, and the P$^+$ pick-up diffusion layer 204 is measured through each pad. At this time, referring to photoelectric current flowing between the first light 'sensing area 203a and the P$^+$ pick-up diffusion layer 204, the characteristic of each color filter is tested. In this words, the characteristic of each color filter is checked by comparing photoelectric current flowing between each of the second light sensing area 203b covered with R or Ye color filter, the third light sensing area 203c covered with G or Ma color filter and the fourth light sensing area 203d covered with B or Cy color filter and P$^+$ pick-up diffusion layer 204, based on the photoelectric current flowing between the first light sensing area 203a and the P$^+$ pick-up diffusion layer 204. This test also makes comparison between wafers or lots (the lot is given as the bundle of wafer in the very case that various wafers are simultaneously processed) possible, by comparing the result of measurement at the same pattern.

The technique of this invention is specifically described according to the desirable embodiments as above, but it should be noted that the embodiments are not for limitation but for explanation. In the case of measuring the characteristic of color filter by using the test pattern of the present invention, the separate quartz wafer or glass wafer is not required.

Therefore, unnecessary cost can be saved and high price of light measuring instrument is not necessary any longer, because it is possible to measure the characteristic of exact color filter on substantial wafer. Moreover, since the measurement of characteristics of color filter is available on the silicon wafer where substantial image sensor is manufactured, the results of measurement are much more exact and it is possible to promptly apply the results to successive wafer or lot. Thus, it contributes to the improvement of yield of the image sensors.

Although the preferred embodiments of the invention have been disclosed for illustrative purposes, those skilled in the art will appreciate that various modifications, additions and substitutions are possible, without departing from the scope and spirit of the invention.

What is claimed is:

1. An image sensor having color filter array having a plurality of color filters, the image sensor comprising:
   a testing means including:
   a) a first light sensing means receiving light from an object in a range of overall wavelength;
   b) a plurality of second light sensing means, each of which is covered with a corresponding color filter; and
   c) a current measuring means for measuring current from the first and second light sensing means,
   whereby electrical characteristics of the image sensor are checked by comparing current between the first light sensing means and the current measuring means with current between the second light sensing means and the current measuring means.

2. The image sensor recited as claim 1, wherein the current measuring means comprises an impurity diffusion region formed on a semiconductor layer for picking up current from the first and second light sensing means.

3. The image sensor recited as claim 2, wherein the current measuring means surrounds the first a nd second light sensing means.

4. The image sensor recited as claim 3, wherein each of the first and second light sensing means comprises a first pad for transferring current generated therein to the impurity diffusion region of the current measuring means.

5. The image sensor recited as claim 4, wherein the current measuring means comprises a second pad for receiving current from the first pad.

6. The image sensor recited as claim 1, wherein each of the first and second light sensing means is isolated from each other by an insulating layer.

7. The image sensor recited as claim 1, wherein the color filter covering the second light sensing means is selected from red, green and blue color filters or yellow, magenta and cyan color filters.

8. The image sensor recited as claim 1, wherein each of the first and second light sensing means is a photodiode.

9. An image sensor comprising:
   a plurality of first photodiodes formed on a wafer, for receiving light from an object and producing an image, wherein the first photodiodes are covered with corresponding color filters; and
   a test means formed on a portion of the wafer, the test means includes:
   a) at least one second photodiode receiving light from an object in a range of overall wavelength;
   b) a plurality of third photodiodes, each of which is covered with a corresponding color filter; and
   c) a current measuring means for measuring current from each of the second and third photodiodes,
   whereby electrical characteristics of the image sensor are checked by comparing current between the second photodiode and the third photodiodes with current between the third photodiodes and the current measuring means.

10. The image sensor recited as claim 9, wherein the current measuring means comprises an impurity diffusion region formed on a semiconductor layer for picking up current from the second and third photodiodes.

11. The image sensor recited as claim 10, wherein the current measuring means surrounds the second and third photodiodes.

12. The image sensor recited as claim 11, wherein each of the second and third photodiodes comprises a first pad for transferring current generated therein to the impurity diffusion region of the Current measuring means.

13. The image sensor recited as claim 12, wherein the current measuring means comprises a second pad for receiving current from the first pad.

14. The image sensor recited as claim 9, wherein each of the second and third photodiodes is isolated from each other by an insulating layer.

15. The image sensor recited as claim 9, wherein the color filter covering the third photodiode is selected from red, green and blue color filters or yellow, magenta and cyan color filters.

* * * * *